US011920933B2

(12) United States Patent
Wu et al.

(10) Patent No.: US 11,920,933 B2
(45) Date of Patent: Mar. 5, 2024

(54) OPTICAL GYROSCOPE WITH A RESONATOR HAVING BIAS ERROR REDUCTION

(71) Applicant: Honeywell International Inc., Charlotte, NC (US)

(72) Inventors: Jianfeng Wu, Tucson, AZ (US); Matthew Wade Puckett, Phoenix, AZ (US); Karl D. Nelson, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 212 days.

(21) Appl. No.: 17/171,858

(22) Filed: Feb. 9, 2021

(65) Prior Publication Data

US 2022/0252400 A1    Aug. 11, 2022

(51) Int. Cl.
*G01C 19/66* (2006.01)
*G01C 19/72* (2006.01)
*H01S 3/108* (2006.01)

(52) U.S. Cl.
CPC ......... *G01C 19/661* (2013.01); *G01C 19/728* (2013.01); *H01S 3/1086* (2013.01)

(58) Field of Classification Search
CPC .. G01C 19/661; G01C 19/728; G01C 19/665; G01C 19/722
See application file for complete search history.

(56) References Cited

U.S. PATENT DOCUMENTS

| 8,259,301 B2* | 9/2012 | Strandjord | G01C 19/72 |
| | | | 356/461 |
| 9,252,559 B2* | 2/2016 | Narayanan | G02B 6/29316 |
| 10,197,397 B2* | 2/2019 | Sanders | G01C 19/727 |
| 10,365,107 B2* | 7/2019 | Sanders | G02B 6/02361 |

(Continued)

FOREIGN PATENT DOCUMENTS

| EP | 2226612 A2 | 9/2010 |
| EP | 2685213 A2 | 1/2014 |
| EP | 2957863 A1 | 12/2015 |

OTHER PUBLICATIONS

Chang et al., "Micrometer-scale optical up-converter using a resonance-split silicon microring resonator in radio over fiber systems", OSA/OFC/NFOEC, 2009, pp. 1 through 3.

(Continued)

*Primary Examiner* — Violeta A Prieto
(74) *Attorney, Agent, or Firm* — Fogg & Powers LLC (57) ABSTRACT

Techniques for reducing the bias error present in optical gyroscopes is disclosed. Such techniques include at least one path length adjustment member placed in an optical gyroscope resonator, which are configured to modulate the optical path length of the resonator so that bias errors attributable to the optical path length are shifted outside of the bandwidth of the optical gyroscope. In some embodiments, the at least one path length adjustment member includes a plurality of microheaters coupled to the resonator, in which case optical path length modulation is achieved by heating the resonator via the microheaters. Alternatively, a plurality of piezo-electric regions can be placed in the resonator, which enables optical path length modulation through electric field gradients applied to the piezo-electric regions.

20 Claims, 7 Drawing Sheets

(56) References Cited

U.S. PATENT DOCUMENTS

| | | | | |
|---|---|---|---|---|
| 2008/0218765 | A1* | 9/2008 | Bergh | G01C 19/726 356/464 |
| 2010/0225922 | A1* | 9/2010 | Strandjord | G01C 19/72 356/461 |
| 2014/0204387 | A1* | 7/2014 | Narayanan | G01C 19/727 356/461 |
| 2015/0369606 | A1* | 12/2015 | Sanders | G01C 19/727 356/461 |
| 2017/0241784 | A1 | 8/2017 | Salit et al. | |
| 2018/0356210 | A1* | 12/2018 | Moore | G01D 5/35312 |
| 2019/0041215 | A1* | 2/2019 | Sanders | G01C 19/726 |

OTHER PUBLICATIONS

Dahlgren, "Optical Gyroscopes: Sensing Rotation Without Moving Parts", Presented to the IEEE SCV LEOS & IMS, May 27, 2003, pp. 1 through 10.
Dell'Olio et al., "Recent advances in miniaturized optical gyroscopes", J. Europ. Opt. Soc. Rap. Public 9, 14013, Mar. 11, 2014, pp. 1 through 14, www.jeos.org.
He et al., "Asymmetry Analysis of the Resonance Curve in Resonant Integrated Optical Gyroscopes", Sensors (Basel), Aug. 2019, pp. 1 through 26, 19(15), MDPI, https://www.ncbi.nlm.nih.gov/pmc/articles/PMC6695801/.
Menendez, "Fiber-Optic Ring Resonator Interferometer", IntechOpen, 2018, pp. 1 through 23.
Psarros et al., "Resonance Splitting in Two Coupled Circular Closed-Loop Arrays and Investigation of Analogy to Traveling-Wave Optical Resonators", Progress In Electromagnetics Research, PEIR 87, 2008, pp. 197 through 214.
Schwelb, "On the nature of resonance splitting in coupled multiring optical resonators", Optics Communications 281, Oct. 20, 2007, pp. 1065 through 1071, ScienceDirect, Elsevier.
Schwelb, "Resonance splitting and its invariance in coupled optical microring resonators", Electrical and Computer Engineering, at least as early as Apr. 28, 2007, pp. 1 through 8, Concordia University, Montreal, QC, Canada.
Shamir, "An overview of Optical Gyroscopes Theory, Practical Aspects, Applications and Future Trends", May 16, 2006, pp. 1 through 24.
Wolfe, "Improving Optical Gyroscope Sensitivity Using a Fast Light Regime", A thesis submitted in partial fulfillment of the requirement for the degree of Bachelor of Science in Physics from The College of William and Mary, May 3, 2016, pp. 1 through 34, Williamsburg, VA.
Yang et al., "Angular-rate sensing by mode splitting in a Whispering-gallery-mode optical microresonator", Measurement, Sep. 2018, pp. 78 through 83, vol. 125, ScienceDirect.
European Patent Office, "Extended European Search Report from EP Application No. 21211338.5", from Foreign Counterpart to U.S. Appl. No. 17/171,858, filed May 25, 2022, pp. 1 through 7, Published: EP.

* cited by examiner

OPTICAL GYROSCOPE WITH A RESONATOR HAVING BIAS ERROR REDUCTION

STATEMENT REGARDING FEDERALLY SPONSORED RESEARCH OR DEVELOPMENT

This material is based upon work supported by the Defense Advanced Research Projects Agency (DARPA) and Space and Naval Warfare Systems Center Pacific (SSC Pacific) under Contract No. N66001-16-C-4017.

BACKGROUND

In many instances, optical gyroscopes can provide advantages over their mechanical counterparts. For example, optical gyroscopes can include no moving parts, and can be more sensitive than mechanical gyroscopes. And with the advent of integrated optical circuits, or mixed electrical and optical integrated circuits, an optical gyroscope can be formed on a chip and can be part of a system on chip (SOC), thereby operating with reduced size than mechanical gyroscopes.

In general, an optical gyroscope, such as a ring-laser gyroscope (RLG) or a resonant fiber-optic gyroscope (RFOG), operates in the following manner. At least two optical beams propagate in opposite directions around one or more windings of a continuous optical waveguide or optical fiber. The optical beams are commonly connotated a CW (clockwise) or a CCW (counter-clockwise) beam, intuitively referenced through the direction around the waveguide in which they propagate. For example, an ideal passive resonant optical gyroscope can use both the CW and CCW beams from external lasers. Meanwhile, an active laser gyroscope can generate both CW and CCW lasers in the gyro cavity.

In another example, a stimulated Brillouin scattering (SBS) optical gyroscope couples a single laser beam into an optical-ring resonator such that the beam propagates in one direction and stimulates at least a first-order Stokes wave that propagates in an opposite direction by virtue of the phenomenon of stimulated Brillouin scattering. While the winding circle is stationary about the sense axis, both the CW and CCW signals have the same optical path length.

A common phenomenon exhibited by optical gyroscopes is the change in optical path length due to the Sagnac effect. As the winding circle is rotated in a CW direction about the sense axis, the CW optical beam propagating in the CW direction effectively experiences a longer optical path length, and therefore, experiences a negative shift of resonance frequency. Likewise, the CCW optical beam propagating in the CCW direction effectively experiences a shorter optical path length with a positive shift of the same magnitude. The difference in the phases of the CW and CCW optical beams is proportional to the angular velocity about the sense axis. By detecting this phase or frequency difference, a gyroscopic system can determine the angular velocity of the optical gyroscope, and of any apparatus on which the optical gyroscope is installed about the sense axis.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, an optical gyroscope is provided. The optical gyroscope comprises at least one laser configured to generate light beams. The optical gyroscope further comprises a first optical coupler coupled to a resonator and the at least one laser. The first optical coupler is configured to transmit a first light beam from the at least one laser in a clockwise direction around the resonator. The optical gyroscope further comprises a second optical coupler coupled to the resonator and at least one laser. The second optical coupler is configured to transmit a second light beam from the at least one laser in a counter-clockwise direction around the resonator. The optical gyroscope further comprises at least one path length adjustment member communicatively coupled to an optical path of the resonator. The optical gyroscope further comprises a controller coupled to the resonator, wherein the controller is configured to control the at least one path length adjustment member to modulate the optical path length of the resonator such that a frequency or wavelength corresponding to the optical path length is modulated outside a bandwidth of the optical gyroscope.

In another embodiment, a system is provided. The system comprises an optical gyroscope, including at least one laser configured to generate light beams. The optical gyroscope further comprises a first optical coupler coupled to a resonator and the at least one laser. The first optical coupler is configured to transmit a first light beam from the at least one laser in a clockwise direction around the resonator. The optical gyroscope further comprises a second optical coupler coupled to the resonator and at least one laser. The second optical coupler is configured to transmit a second light beam from the at least one laser in a counter-clockwise direction around the resonator. The optical gyroscope further comprises at least one path length adjustment member communicatively coupled to an optical path of the resonator. The optical gyroscope further comprises a controller coupled to the resonator, wherein the controller is configured to control the at least one path length adjustment member to modulate the optical path length of the resonator such that a frequency or wavelength corresponding to the optical path length is modulated outside a bandwidth of the optical gyroscope. The system further comprises a processing system coupled to the optical gyroscope, wherein the processing system is configured to determine rotation rate measurements based on received signals corresponding to the first and second light beams.

In yet another embodiment, a method is provided. The method comprises receiving measurements corresponding to an optical path length of an optical gyroscope resonator. The method further comprises measuring a bandwidth of the optical gyroscope. The method further comprises modulating the optical path length so that a frequency or wavelength corresponding to the optical path length is modulated outside the bandwidth.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The quality of optical gyroscopes depends in substantial part on the accuracy of the resonance measurements given by the optical gyroscope, which can be adversely affected by unintentional or unavoidable sources of bias. One such source of bias arises from imperfections attributable to the design and manufacture of the gyroscope, such as from imperfect optical components and/or design implementations. For example, imperfections in a resonator can cause a portion of the propagating light to be reflected in the opposite direction, which can aggregate in magnitude as the light travels and interfere with the propagating light. As used herein, the term "resonator" (alternatively, "optical resonator") means a ring cavity that allows light beams to circulate inside the gyroscope. The light beams have certain discrete frequencies (also known as resonances) and can form constructive interference after each cycle through the resonator. Those resonances are separated by a frequency gap known as a free spectral range (FSR). When the gyroscope experiences rotation motion, the resonances for clockwise (CW) beams and counterclockwise (CCW) beams will be separated proportional to the rotation rate.

Any outstanding reflected portions remaining in the resonator can thereby contribute to bias error in the gyroscope. Since gyroscopes utilize resonances to determine rotation rate, the resonance frequency change attributable to bias error instead of an actual change in rotation thus reduces the accuracy of the optical gyroscope.

Figure 1A:
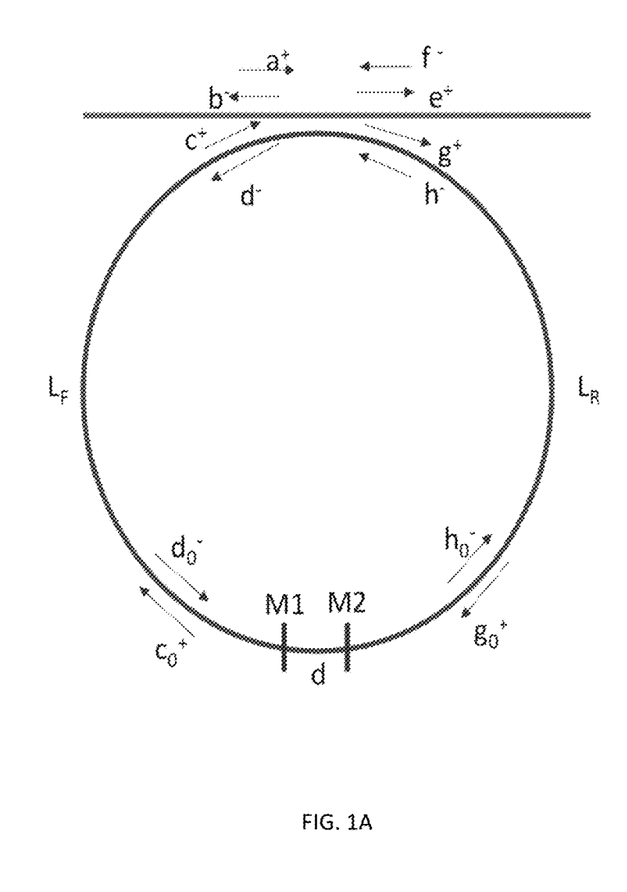
FIG. 1A depicts a diagram of light propagating through a prior art optical resonator.

With reference to FIG. 1A, vectors a-h represent the propagation of light through an optical resonator, such as a resonator coil of an RFOG. For illustrative purposes, + and − refer to the direction in which the light travels through the resonator, where + is the clockwise (CW) direction and − is the counterclockwise (CCW) direction.

In theory, any back reflection will split the resonance peak into two peaks dependent on the amplitude of the back reflection and FSR of the cavity. Two back reflection points split the resonance peak as well. They form a weak Fabry-Perot cavity whose reflection can be represented by one virtual reflection point. The reflectivity depends on the reflectivity of each reflection points and distance between them. An illustrative example is shown in FIG. 1A by the placement of two partially reflecting mirrors, M1 and M2, separated by a variable optical path distance d. If the optical path length between M1 and M2 is an integer multiple of the resonance wavelength, then the beams reflects from M1 and M2 destructively interfere with one another completely, such that, absent any other imperfections in the optical resonator, there is a single resonant peak at the excited longitudinal mode as described above.

Figure 1B:
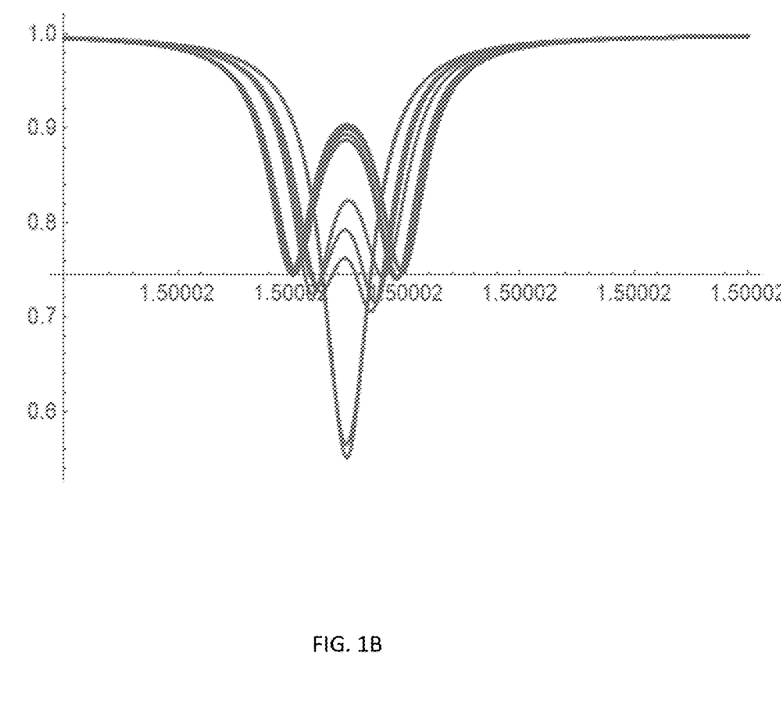
FIG. 1B depicts a graph of signal amplitude as a function of wavelength of a prior art optical resonator.

But if the optical path length d between M1 and M2 is not an integer multiple of the resonance wavelength, then each forward-propagating beam and the corresponding backscattered beam constructively interfere with one another to some degree, such that the ideal single-resonant frequency response of the optical resonator splits into two resonances. FIG. 1B illustrates this phenomenon through the multiple split resonance peaks. Such effects also create asymmetry in the resonance peaks as shown in FIG. 1B, and as a result, the gyroscope cannot distinguish the resonance frequency change due to a phase change caused by a change in angular velocity, and a phase change caused by changes in optical path length. This reduces the accuracy of the measurements (e.g., by observing a change in angular velocity when in fact no change has occurred).

The embodiments described herein provide one or more path length adjustment members to reduce or eliminate the bias error, which may be inherent to the gyroscope, by modulating the effective optical path length of the optical resonator so that the frequency response attributable to the optical path length gets modulated beyond the bandwidth of the servo loop monitored by the gyroscope. Through optical path length modulation, any resonance changes attributable to optical path length variation can be pushed outside the bandwidth used for rate detection. The optical gyroscope in turn can then measure a stable average resonant wavelength of the optical resonator.

Figure 2:
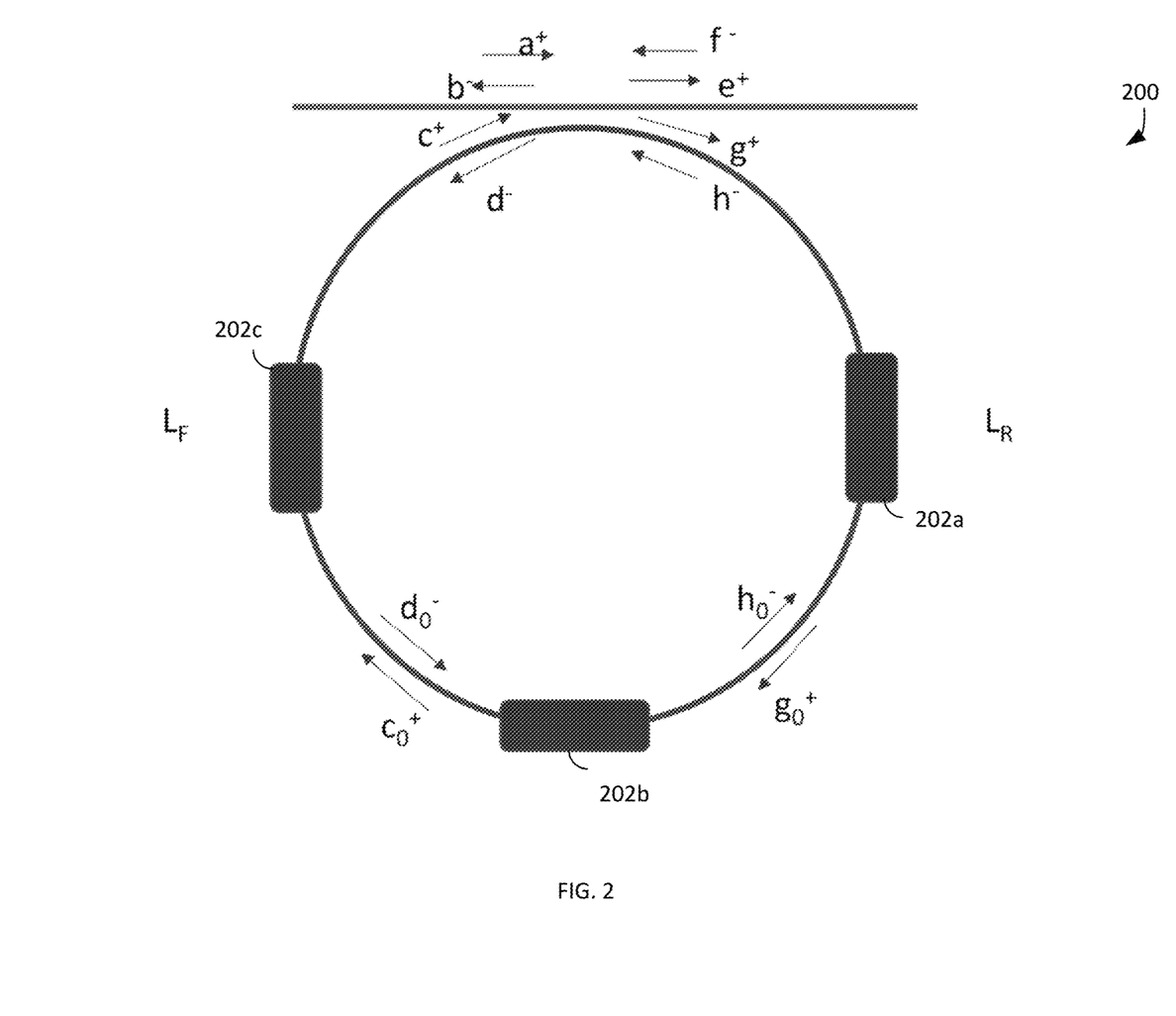
FIG. 2 depicts a diagram of a plurality of microheaters coupled to an optical resonator, as described in one or more embodiments.

Referring to FIG. 2, one embodiment of a system 200 configured to modulate the optical path length of a resonator is depicted. System 200 can be implemented in a passive or active optical gyroscope, which can include but not limited to: a fiber optic gyroscope (e.g., RFOG, IFOG), a RLG, waveguide laser gyroscope, and other resonator optical gyroscopes. The optical resonator can be made of an optical medium, such as a fiber optic cable.

System 200 (and subsequent systems described herein) can be used to determine the rotation rate of an object, e.g.

a vehicle. Use of the term "vehicle" is not intended to be limiting and includes all classes of vehicles falling within the ordinary meaning of the term. This would include but not limited to, aerial traversing vehicles (e.g., commercial, non-commercial, or recreational aircraft), unmanned and/or space traversing vehicles (e.g., satellites, urban air mobility vehicles), water traversing vehicles (e.g., ships, submarines), and land traversing vehicles (e.g., automobiles including cars, trucks, motorcycles).

System 200 further includes a plurality of path length adjustment members 202a-202c microheaters 202a-202c coupled to the resonator coil. The path length adjustment elements 202a-202c are microheaters in this example embodiment. Each microheater 202 is configured to heat a portion of the resonator. While FIG. 2 illustrates three microheaters, more or less microheaters can be coupled to the resonator coil.

Microheaters 202a-c can modulate the effective optical path length between the effective reflectors of the resonator. Since increasing the temperature of the optical material from which the optical resonator is formed causes thermal expansion and refractive index change over the corresponding region of the resonator, the optical path length over the region is also increased. In contrast, decreasing the temperature causes thermal contraction of the corresponding region and refractive index change, thereby decreasing the effective optical path length. By increasing the modulation frequency, microheaters 202a-c can push optical path length biases out of the interested measurement bandwidth.

In some embodiments, microheaters 202a-c are positioned symmetrically about the resonator such that each microheater heats an equal portion of the resonator. Such embodiments can further reduce the impact of additional sources of bias attributable to microheaters 202a-c as a result of asymmetrical coupling with the resonator. However, another technique to adjust the effective placement of microheaters 202a-c is to shift the phase of the modulation frequency of selected microheaters relative to another microheater. For example, microheater 202a can occupy a smaller portion of the resonator relative to one (or both) of microheater 202b and microheater 202c. In this case, microheater 202a can be modulated with a phase delay relative to microheaters 202b-c. This way, even when microheaters 202a-c are not symmetrically placed around the resonator, or not exactly symmetrical, microheaters 202a-c can still modulate the optical path length in the resonator without introducing further bias errors to the system.

Figure 3:
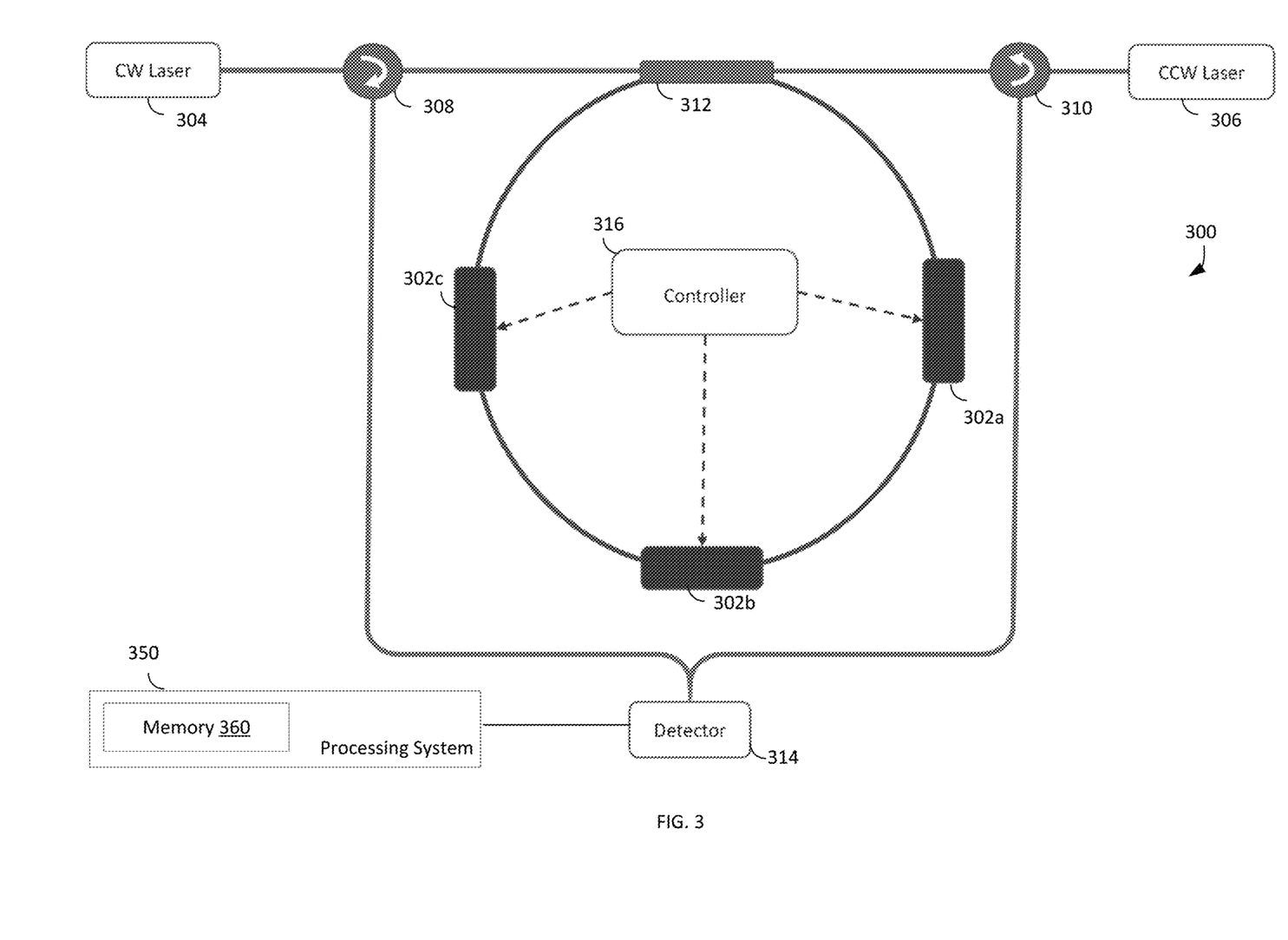
FIG. 3 depicts a diagram of a system including a plurality of microheaters coupled to an optical resonator, as described in one or more embodiments.

FIG. 3 illustrates an example of a system 300 including a plurality of microheaters configured to modulate an effective optical path length of a resonator. A first laser 304 (referred to as a clockwise laser) transmits an optical signal e.g., light beam that passes through circulator 308 to coupler 312, which can include an optical fiber or free-space coupling optics. The CW signal then travels from coupler 312 through the resonator in the clockwise direction, beginning at microheater 302a, then to microheater 302b, and finally microheater 302c. As the CW signal travels through microheaters 302a-c, its optical path length is modulated so that the frequency response attributable to the optical path length is higher than the gyroscope sampling rate of system 300. The heat dispersion and thus optical path modulation is controlled by a controller 316.

Controller 316 (and other controllers or processing systems described herein) may include any one or combination of processors, microprocessors, digital signal processors, application specific integrated circuits, field programmable gate arrays, and/or other similar variants thereof. Controller 316 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Controller 316 can activate or deactivate microheaters 302a-c through appropriate circuitry to regulate the modulation of the optical path length through the resonator. For example, controller 316 can receive and process data on the thermal environment of portions of the resonator or the optical path length of signals propagating through the resonator. Controller 316 can then adjust microheaters 302a-c in response to feedback data. In one embodiment, controller 316 is configured to activate microheaters 302a-c such that the optical path length is modulated to a length of $\lambda/2$, where $\lambda$ is the wavelength of the resonant signal. In another embodiment, the optical path length is modulated to a corresponding frequency that is at least ten times higher than the maximum sampling frequency of the system bandwidth.

Referring back to FIG. 3, coupler 312 receives the CW signal after propagating through the resonator and transmits it to circulator 310. Optionally, a detector 314 is optically coupled to circulators 310 and 308 configured to measure the beat frequency between the two CW and CCW signals generated by the resonator, which can be used to calculate the rotation rate. The CW signal can then pass through circulator 308 and re-enter the resonator through coupler 312 as described above. In some embodiments, a processing system 350 including one or more processors receives the detected signal from detector 314 and calculates the rotation rate based on the signal. Processing system 350 may also include memory 360 which stores processed data. In the opposing direction, CCW laser 306 transmits a CCW signal that passes through circulator 310 and enters the resonator through coupler 312. Similar to the CW signal, the CCW signal passes through microheaters 302c-a in the counter-clockwise direction, where the optical path length is modulated at a frequency higher than the sampling frequency of system 300. After exiting coupler 312, the CCW signal passes through circulator 308 (in which a portion enters optional detector 314 for rotation rate calculation), and re-enters circulator 310, after which the CCW signal can repeat propagation through the resonator.

Although system 300 depicts optical path length modulation through microheaters placed in the resonator, optical path length modulation can be accomplished through other techniques as well. For example, referring to FIG. 4, optical path length can be modulated through the use of piezoelectric regions in the resonator. Structurally, system 400 functions similarly to system 300 described above. However, instead of instead of microheaters 302a-320c, the path length adjustment members are piezoelectric regions 402a-420c, although a mix of microheaters and piezo-electric regions can also be used. The piezoelectric regions 402a-402c are placed in the resonator. Three regions are shown for illustrative purposes, but system 400 can include more or fewer regions as appropriate.

Figure 4:
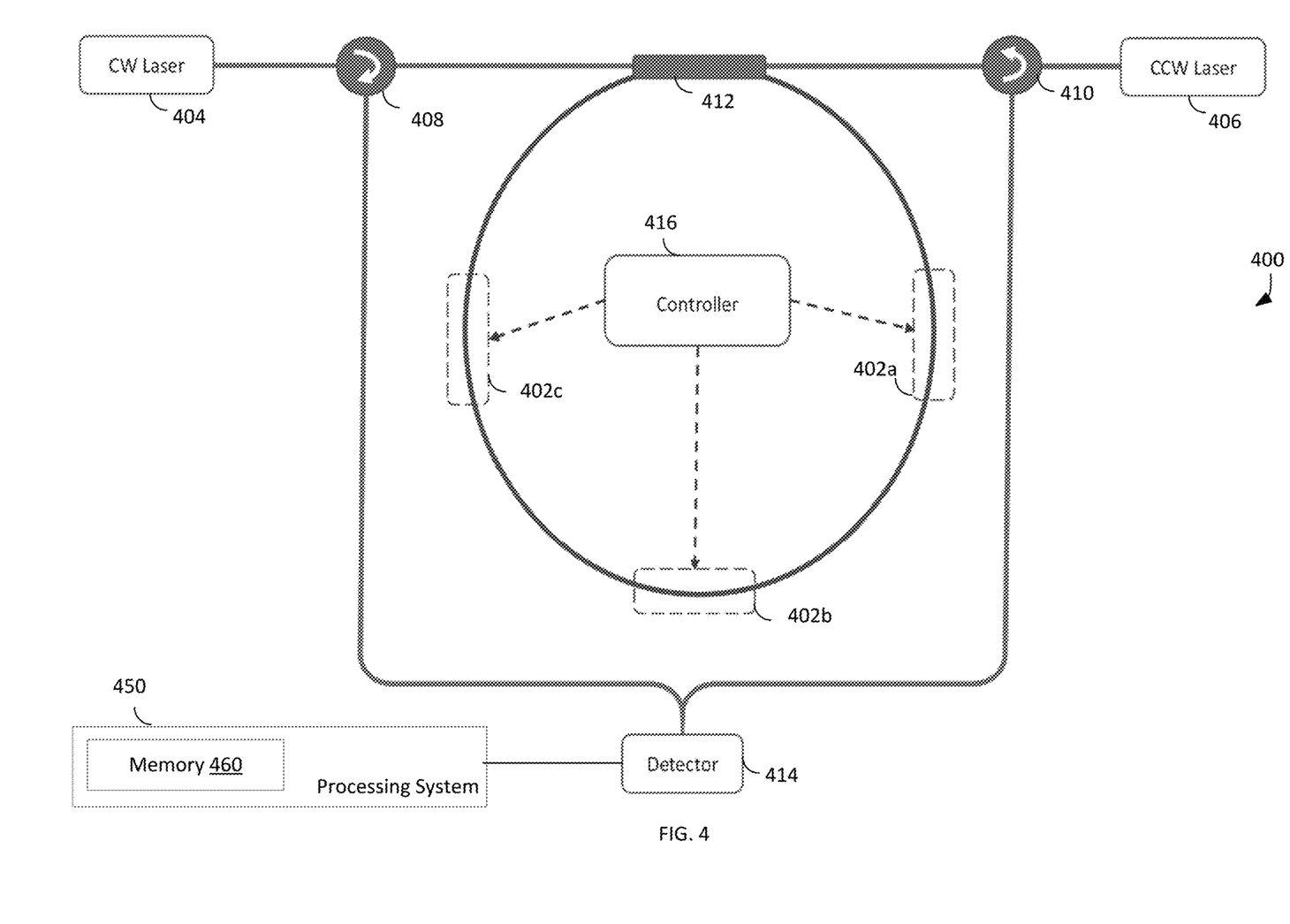
FIG. 4 depicts a diagram of a system including a plurality of piezo-electric regions in an optical resonator, as described in one or more embodiments.

Piezoelectric regions 402a-c can be made of a material with piezoelectric properties. When the CW and CCW signal enter the resonator, an electric field can be generated across piezoelectric regions 402a-c, which modulates the effective optical path length of the resonator as the signals pass through piezoelectric regions 402a-c. The electric field can further be modulated as needed to modulate the optical path length outside the bandwidth of system 400. Piezoelectric regions 402a-c are controlled by controller 416. In some embodiments, controller 416 can command circuitry coupled to piezoelectric regions 402a-c to generate and adjust an electric field to achieve the desired modulation.

Figure 5:
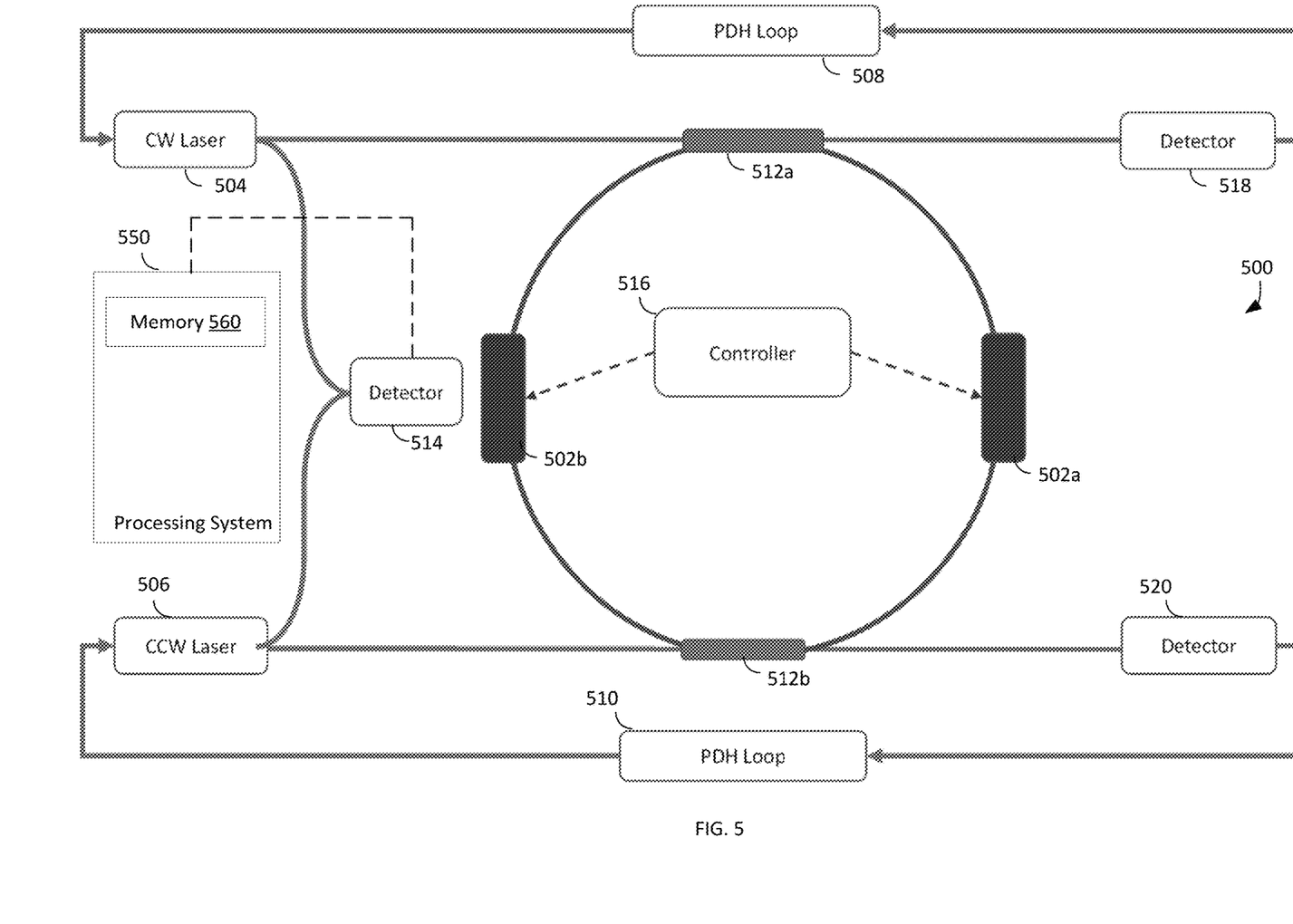
FIG. 5 depicts a diagram of a system including a plurality of microheaters coupled to an optical resonator, as described in one or more embodiments.

FIG. 5 depicts an example of a system 500 for modulating an optical path length of a resonator used in passive resonator gyro configuration. System 500 includes two microheaters 502a-b placed in the resonator and regulated by controller 516. However, system 500 can also be modified to include piezoelectric regions instead of microheaters as described above.

CW laser 504 transmits a CW signal that splits into multiple portions. One portion enters optional detector 514, which is configured to measure the beat frequency between CW laser 504 and CCW laser 506, which as described above, can be coupled to processing system 550 to calculate the rotation rate from the two signals. Another portion enters coupler 512a and propagates in the clockwise direction through microheaters 502a-b. The reflection beam from coupler 512a is coupled into detector 518, in which detector 518 is configured to transform the optical CW signal into a corresponding electrical signal.

The detected CW signal gets transmitted to pound-drever-hall (PDH) loop 508. PDH loop 508 includes circuitry (PDH circuitry) that is configured to lock the frequency of the CW signal to that of the resonant frequency of system 500. Thus, PDH loop 508 sends a feedback signal to CW laser 504 based on the differences in frequency between the resonant frequency and the frequency of the CW signal transmitted by CW laser 504.

System 500 functions similarly in the CCW direction. CCW laser 506 transmits a CCW signal that is split, with a portion transmitted to detector 514 for rate calculation. Another portion is transmitted to coupler 512b, which then propagates in the counter-clockwise direction through microheaters 502a-b. The CCW signal portion then gets reflected by coupler 512b and propagates to detector 520 (which functions similarly to detector 518) and received by PDH loop 510. PDH loop 510 includes circuitry that can lock the frequency of the CCW signal to the resonant frequency of system 500. This feedback signal can then be transmitted to CCW laser 506.

Figure 6:
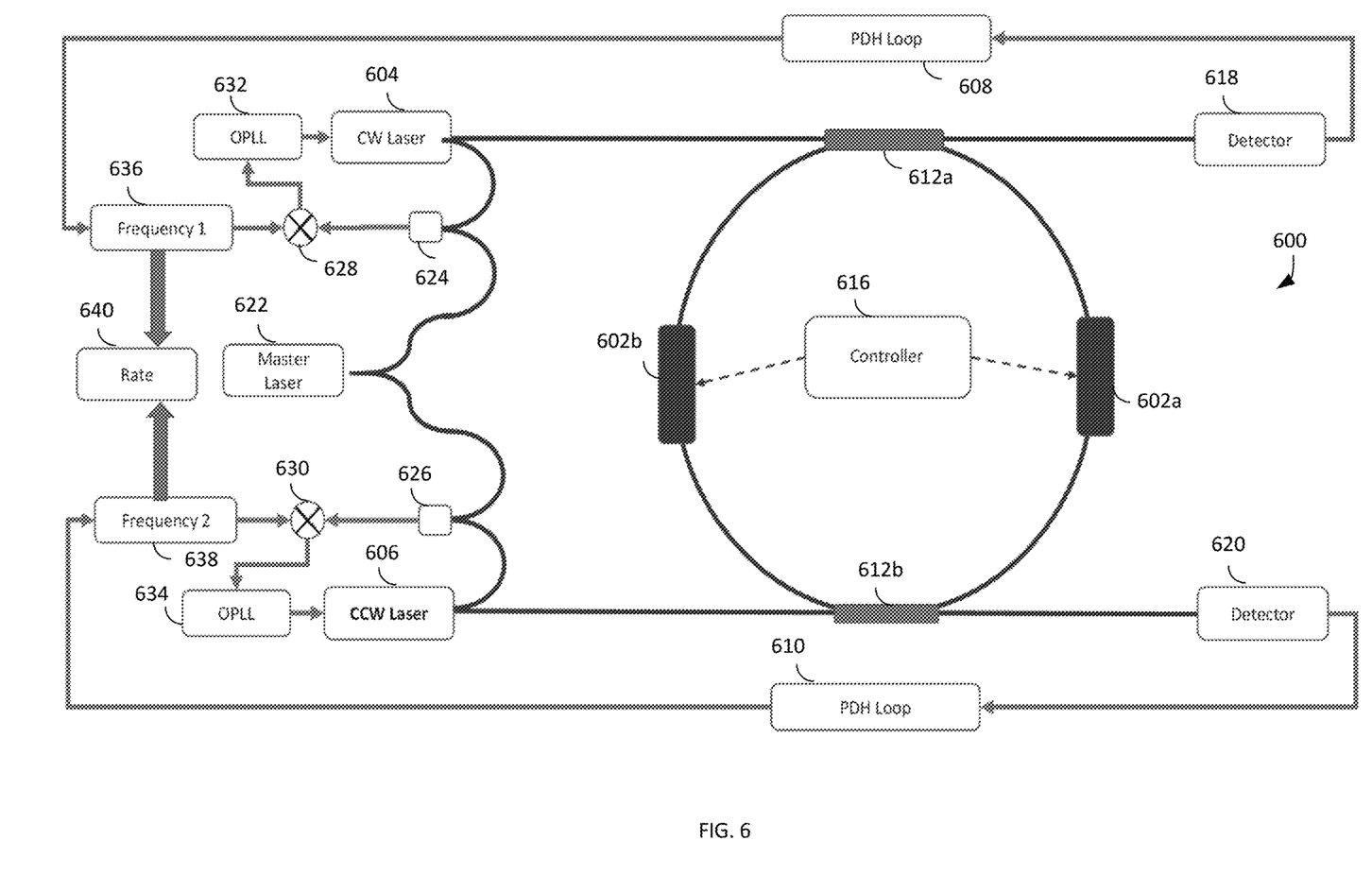
FIG. 6 depicts a diagram of a system including a plurality of microheaters coupled to an optical resonator, as described in one or more embodiments.

FIG. 6 depicts another example of a system 600 for modulating an optical path length of a resonator. Like FIG. 5, system 600 includes two microheaters 602a-b placed in the resonator, which when heated enable the modulation of the optical path length to a wavelength or corresponding frequency outside the bandwidth of system 600. However, microheaters 602a-b can instead be replaced with piezoelectric regions.

In system 600, master laser 622 transmits a reference signal to optical phase lock loop (OPLL) detectors 624 and 626. Additionally, OPLL detectors 624 and 626 each receive a corresponding signal from CW laser 604 or CCW laser 606 and transform the respective CW and CCW signals into corresponding electrical signals, which then provide each mixed signal to mixers 628 and 630, respectively. Mixers 628 and 630 mix the combined reference signal with a respective resonance-locked signal from PDH loop 608 or PDH loop 610, and transmits the output to OPLL circuitry 632 or 634, where it can be used to adjust the CW and CCW signal based on the reference signal from master laser 622 and the resonance-locked signal from PDH loop 608.

System 600 functions in many respects similarly to system 500. The CW signal from CW laser 604 is transmitted to coupler 612a where it travels in the clockwise direction through microheaters 602a-b. After traversing through the resonator, the CW signal exits coupler 612a and propagates to detector 618, which transforms CW signal into a corresponding electrical signal. The electrical signal is received at PDH loop 608, which locks the signal to a frequency 1 at block 636. The locked signal is used both for rotation rate processing at block 640 (for example, through the processing systems described above) in addition to a feedback signal fed back into mixer 628.

On the opposing end, the CCW signal from CCW laser 606 propagates to coupler 612b and traverses the resonator in the counter-clockwise direction through microheaters 602a-b. Coupler 612b then transmits the CCW signal to detector 620, at which point detector 620 transforms the CCW signal into a corresponding electrical signal. PDH loop 610 receives the electrical signal and locks the signal at a frequency 2 (indicated at block 638), which is used as a feedback signal input into mixer 630. Rotation rate processor 640 receives the two signals at frequencies 1 and 2 and determines the rotation rate based on the Sagnac effect.

Figure 7:
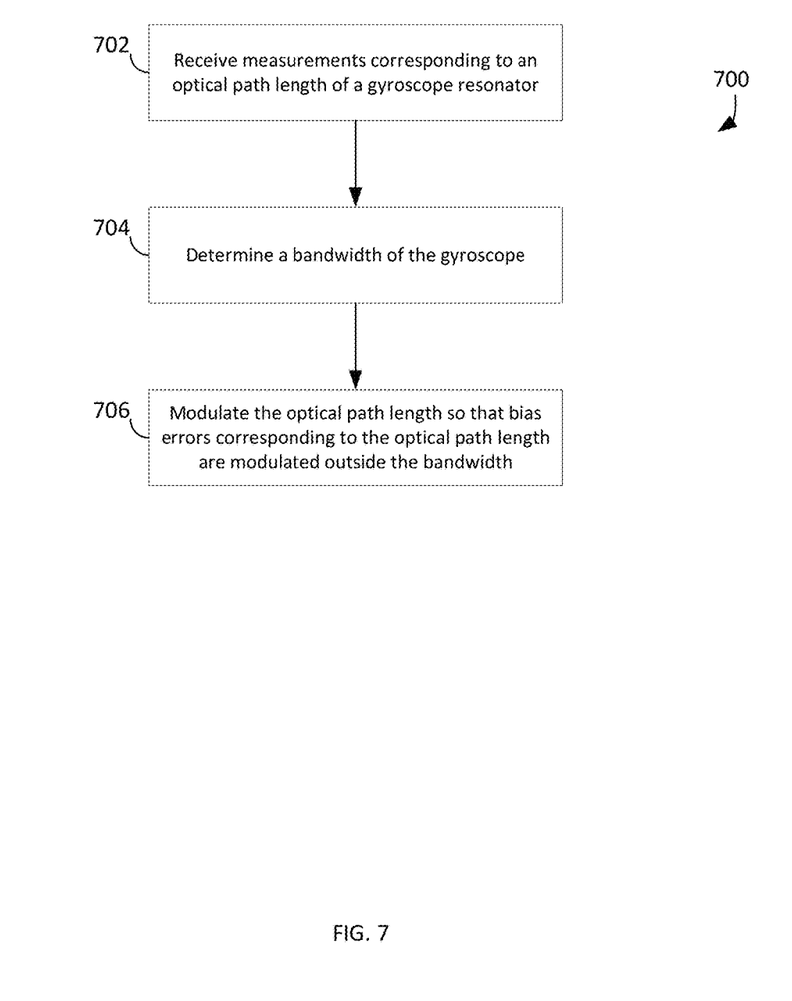
FIG. 7 depicts a flow chart of a method for modulating an optical path length of an optical gyroscope resonator; as described in one or more embodiments.

FIG. 7 is a flow chart of a method 700 for reducing bias error in a resonator of an optical gyroscope. Method 700 may be implemented via the techniques described with respect to FIGS. 1-6, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 700 begins at block 702 by receiving measurements corresponding to an optical path length of an optical gyroscope resonator. The gyroscope can be a RFOG, RLG, or any other type of optical gyroscope. Method 700 then proceeds to block 704 by determining a bandwidth of the optical gyroscope, which can be represented in terms of frequency or wavelength measurements. The wavelength measurements can be converted to a frequency measurement (and vise-versa) using known physical relationships between frequency and wavelength.

At block 706, method 700 modulates the optical path length so that bias errors attributable to the optical path length are pushed outside of the gyroscope bandwidth. For example, method 700 can activate microheaters coupled to the optical resonator and adjust the microheaters in a way that shifts frequencies from the optical path length greater than the bandwidth range of the gyroscope. In some embodiments, the optical path length is modulated so that such frequencies are at least ten times higher than the frequency bandwidth. In other embodiments, method 700 modulates the optical path length to a length of $\lambda/2$, where $\lambda$ is the wavelength of the resonant signal. Alternatively, method 700 can modulate the optical path length by applying an electric field gradient across piezo-electric regions distributed in the optical resonator. However, the optical path length can be modulated through other techniques as well.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device.

Generally, a processor will receive instructions and data from a read-only memory and/or a random-access memory. Storage devices suitable for tangibly embodying computer program instructions and data include all forma of nonvolatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed ASICs.

The terms "approximately" or "substantially" mean that the value or parameter specified may be somewhat altered, as long as the alteration does not result in nonconformance of the process or structure to the illustrated embodiment from the perspective of one having ordinary skill in the art. Finally, the term "exemplary" merely indicates the accompanying description is used as an example, rather than implying an ideal, essential, or preferable feature of the invention.

EXAMPLE EMBODIMENTS

Example 1 includes an optical gyroscope, comprising: at least one laser configured to generate light beams; a first optical coupler coupled to a resonator and the at least one laser, wherein the first optical coupler is configured to transmit a first light beam from the at least one laser in a clockwise direction around the resonator; a second optical coupler coupled to the resonator and at least one laser, wherein the second optical coupler is configured to transmit a second light beam from the at least one laser in a counter-clockwise direction around the resonator; at least one path length adjustment member communicatively coupled to an optical path of the resonator; and a controller coupled to the resonator, wherein the controller is configured to control the at least one path length adjustment member to modulate the optical path length of the resonator such that a frequency or wavelength corresponding to the optical path length is modulated outside a bandwidth of the optical gyroscope.

Example 2 includes the optical gyroscope of Example 1, wherein the optical gyroscope comprises one of a ring laser gyroscope and a fiber optic gyroscope.

Example 3 includes the optical gyroscope of any of Examples 1-2, wherein the at least one path length adjustment member comprises a plurality of microheaters, wherein the controller is configured to modulate an optical path length of the resonator by activating the plurality of microheaters.

Example 4 includes the optical gyroscope of Example 3, wherein the plurality of microheaters are positioned symmetrically about the resonator.

Example 5 includes the optical gyroscope of any of Examples 1-4, wherein the at least one path length adjustment member comprises a plurality of piezo-electric regions, wherein the controller is configured to modulate an optical path length of the resonator by applying an electric field across the plurality of piezo-electric regions.

Example 6 includes the optical gyroscope of Example 5, wherein the plurality of piezo-electric regions is positioned symmetrically about the resonator.

Example 7 includes the optical gyroscope of any of Examples 1-6, wherein the controller is configured to modulate the optical path length such that a frequency that is at least ten times greater than the bandwidth of the optical gyroscope.

Example 8 includes a system, comprising: an optical gyroscope, wherein the optical gyroscope including, at least one laser configured to generate light beams; a first optical coupler coupled to a resonator and the at least one laser, wherein the first optical coupler is configured to transmit a first light beam from the at least one laser in a clockwise direction around the resonator; a second optical coupler coupled to the resonator and at least one laser, wherein the second optical coupler is configured to transmit a second light beam from the at least one laser in a counter-clockwise direction around the resonator; at least one path length adjustment member communicatively coupled to an optical path of the resonator; and a controller coupled to the resonator, wherein the controller is configured to control the at least one path length adjustment member to modulate the optical path length of the resonator such that a frequency or wavelength corresponding to the optical path length is modulated outside a bandwidth of the optical gyroscope, and a processing system coupled to the optical gyroscope, wherein the processing system is configured to determine rotation rate measurements based on received signals corresponding to the first and second light beams.

Example 9 includes the system of Example 8, wherein the optical gyroscope comprises one of: a ring laser gyroscope and a fiber optic gyroscope.

Example 10 includes the system of any of Examples 8-9, wherein the at least one path length adjustment member further comprises a plurality of microheaters coupled to the controller and the resonator, wherein the controller is configured to modulate an optical path length of the resonator by activating the plurality of microheaters.

Example 11 includes the system of Example 10, wherein the plurality of microheaters are positioned symmetrically about the resonator.

Example 12 includes the system of any of Examples 8-11, wherein the at least one path length adjustment member further comprises a plurality of piezo-electric regions, wherein the controller is configured to modulate an optical path length of the resonator by applying an electric field across the plurality of piezo-electric regions.

Example 13 includes the system of Example 12, wherein the plurality of piezo-electric regions is positioned symmetrically about the resonator.

Example 14 includes the system of any of Examples 8-13, wherein the controller is configured to modulate the optical path length to a corresponding frequency that is at least ten times greater than the bandwidth of the optical gyroscope.

Example 15 includes a method of reducing bias error in a resonator of an optical gyroscope, the method comprising: receiving measurements corresponding to an optical path length of an optical gyroscope resonator; measuring a bandwidth of the optical gyroscope; and modulating the optical path length so that a frequency or wavelength corresponding to the optical path length is modulated outside the bandwidth.

Example 16 includes the method of Example 15, wherein modulating the optical path length further comprises activating a plurality of microheaters coupled to the optical gyroscope resonator.

Example 17 includes the method of any of Examples 15-16, wherein modulating the optical path length further comprises applying an electric field across a plurality of piezo-electric regions that are on the optical gyroscope resonator.

Example 18 includes the method of any of Examples 15-17, wherein modulating the optical path length further comprises to modulating the optical path length to a corresponding frequency that is at least ten times greater than the bandwidth of the optical gyroscope.

Example 19 includes the method of any of Examples 15-18, wherein receiving measurements corresponding to an optical path length further comprises receiving measurements from a ring laser gyroscope or a fiber optic gyroscope.

Example 20 includes the method of any of Examples 15-19, wherein modulating the optical path length comprises modulating to a value that is at least half a wavelength of a resonance signal of the resonator.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An optical gyroscope, comprising:
    at least one laser configured to generate light beams;
    a first optical coupler coupled to a resonator and the at least one laser, wherein the first optical coupler is configured to transmit a first light beam from the at least one laser in a clockwise direction around the resonator;
    a second optical coupler coupled to the resonator and the at least one laser, wherein the second optical coupler is configured to transmit a second light beam from the at least one laser in a counter-clockwise direction around the resonator;
    a plurality of path length adjustment members coupled to an optical path within the resonator, wherein each path length adjustment member is configured to adjust a respective portion of the optical path within the resonator, wherein at least one path length adjustment member of the plurality of path length adjustment members is positioned about a midpoint of the optical path within the resonator; and
    a controller communicatively coupled to the plurality of path length adjustment members, wherein the controller is configured to control the plurality of path length adjustment members based on environmental data received for each respective path length adjustment member, and to modulate an optical path length of the resonator such that at least one of a frequency and wavelength corresponding to the optical path length is modulated outside a bandwidth of the optical gyroscope,
    wherein the controller is configured to selectively modulate a phase shift of one path length adjustment member relative to another path length adjustment member so that different phase shifts are modulated between the one path length adjustment member and the another path length adjustment member.

2. The optical gyroscope of claim 1, wherein the optical gyroscope comprises one of a ring laser gyroscope and a fiber optic gyroscope.

3. The optical gyroscope of claim 1, wherein the plurality of path length adjustment members comprises a plurality of microheaters, wherein the controller is configured to modulate an optical path length of the resonator by activating the plurality of microheaters.

4. The optical gyroscope of claim 3, wherein the plurality of microheaters are positioned symmetrically about the resonator.

5. The optical gyroscope of claim 1, wherein the plurality of path length adjustment members comprises a plurality of piezo-electric regions, wherein the controller is configured to modulate an optical path length of the resonator by applying an electric field across the plurality of piezo-electric regions.

6. The optical gyroscope of claim 5, wherein the plurality of piezo-electric regions is positioned symmetrically about the resonator.

7. The optical gyroscope of claim 1, wherein the controller is configured to modulate the optical path length such that the at least one of the frequency and wavelength corresponding to the optical path length is at least ten times greater than the bandwidth of the optical gyroscope.

8. A system, comprising:
    an optical gyroscope, wherein the optical gyroscope including,
        at least one laser configured to generate light beams;
        a first optical coupler coupled to a resonator and the at least one laser, wherein the first optical coupler is configured to transmit a first light beam from the at least one laser in a clockwise direction around the resonator;
        a second optical coupler coupled to the resonator and at least one laser, wherein the second optical coupler is configured to transmit a second light beam from the at least one laser in a counter-clockwise direction around the resonator;
        a plurality of path length adjustment members coupled to an optical path within the resonator, wherein each path length adjustment member is configured to adjust a respective portion of the optical path within the resonator, wherein at least one path length adjustment member of the plurality of path length adjustment members is positioned about a midpoint of the optical path within the resonator; and
        a controller communicatively coupled to the plurality of path length adjustment members, wherein the controller is configured to control the plurality of path length adjustment members based on environmental data received for each respective path length adjustment member, and to modulate an optical path length of the resonator such that at least one of a frequency and wavelength corresponding to the optical path length is modulated outside a bandwidth of the optical gyroscope, wherein the controller is configured to selectively modulate a phase shift of one path length adjustment member relative to another path length adjustment member so that different phase shifts are modulated between the one path length adjustment member and the another path length adjustment member, and a processing system coupled to the optical gyroscope, wherein the processing system is configured to determine rotation rate measurements based on received signals corresponding to the first and second light beams.

9. The system of claim 8, wherein the optical gyroscope comprises one of: a ring laser gyroscope and a fiber optic gyroscope.

10. The system of claim 8, wherein the plurality of path length adjustment members further comprises a plurality of microheaters coupled to the controller and the resonator, wherein the controller is configured to modulate an optical path length of the resonator by activating the plurality of microheaters.

11. The system of claim 10, wherein the plurality of microheaters are positioned symmetrically about the resonator.

12. The system of claim 8, wherein the plurality of path length adjustment members further comprises a plurality of piezo-electric regions, wherein the controller is configured to modulate an optical path length of the resonator by applying an electric field across the plurality of piezo-electric regions.

13. The system of claim 12, wherein the plurality of piezo-electric regions is positioned symmetrically about the resonator.

14. The system of claim 8, wherein the controller is configured to modulate the optical path length such that the at least one of the frequency and wavelength corresponding to the optical path length is at least ten times greater than the bandwidth of the optical gyroscope.

15. A method of reducing bias error in a resonator of an optical gyroscope, the method comprising:

receiving measurements corresponding to an optical path length of an optical gyroscope resonator, wherein the optical gyroscope resonator comprises a plurality of path length adjustment members coupled to an optical path within the optical gyroscope resonator, wherein each path length adjustment member is configured to adjust a respective portion of the optical path within the optical gyroscope resonator, wherein at least one path length adjustment member of the plurality of path length adjustment members is positioned about a midpoint of the optical path within the resonator;

measuring a bandwidth of the optical gyroscope; and modulating the optical path length by controlling each of the plurality of optical path length adjustment members so that at least one of a frequency and wavelength corresponding to the optical path length is modulated outside the bandwidth, wherein the controlling is configured to selectively modulate a phase shift of one path length adjustment member relative to another path length adjustment member so that different phase shifts are modulated between the one path length adjustment member and the another path length adjustment member.

16. The method of claim 15, wherein modulating the optical path length further comprises activating a plurality of microheaters coupled to the optical gyroscope resonator.

17. The method of claim 15, wherein modulating the optical path length based on the bandwidth further comprises applying an electric field across a plurality of piezo-electric regions that are on the optical gyroscope resonator.

18. The method of claim 15, wherein modulating the optical path length further comprises to modulate the optical path length such that the at least one of the frequency and wavelength corresponding to the optical path length is at least ten times greater than the bandwidth of the optical gyroscope.

19. The method of claim 15, wherein receiving measurements corresponding to an optical path length further comprises receiving measurements from a ring laser gyroscope or a fiber optic gyroscope.

20. The method of claim 15, wherein modulating the optical path length comprises modulating to a value that is at least half a wavelength of a resonance signal of the optical gyroscope resonator.

* * * * *